May 6, 1969  M. A. FERADAY  3,442,761

NUCLEAR REACTOR FUEL ELEMENT

Filed June 16, 1967

INVENTOR
Melville A. Feraday
BY
PATENT AGENT

United States Patent Office 3,442,761
Patented May 6, 1969

3,442,761
NUCLEAR REACTOR FUEL ELEMENT
Melville A. Feraday, Deep River, Ontario, Canada, assignor to Atomic Energy of Canada Limited, Ottawa, Ontario, Canada, a corporation of Canada
Filed June 16, 1967, Ser. No. 646,590
Claims priority, application Canada, July 18, 1966, 965,709
Int. Cl. G21c 3/04
U.S. Cl. 176—67        7 Claims

ABSTRACT OF THE DISCLOSURE

A nuclear fuel element in which the fuel is contained by a sheathing assembly consisting of inner and outer sheaths formed from zirconium or zirconium alloy separated by an interlayer of ductile aluminum or aluminum-uranium alloy having a high thermal conductivity.

---

This invention relates to a fuel element for a nuclear reactor and, in particular, to a fuel element having a sheath assembly formed in three overlying layers.

The nature of the sheathing used to surround the nuclear fuel in any fuel element represents a compromise between several conflicting factors. From one aspect, to avoid distortion of the fuel element and any failure leading to leakage of the nuclear fuel, the sheathing should be as thick as possible and constructed from a material of high strength. From another aspect, to minimize the inevitable absorption of neutrons by the sheathing material, it should be as thin as possible and constructed from a material having a low neutron capture cross-section.

A further difficulty occurs in the design of fuel elements to be exposed to high temperature water, such as occurs in pressurized water, boiling water or steam cooled reactors. A sheathing defect in zirconium alloy clad uranium metal fuel, when exposed to high temperature water causes corrosion at a rate leading to almost catastrophic failure. Accordingly, this type of fuel has not been used as widely as possible although it possesses undoubted economic advantages.

A form of fuel element utilizing zirconium alloy clad uranium metal fuel and designed to be corrosion resistant to high temperature water, has been described in applicant's copending application Ser. No. 478,466, filed Aug. 10, 1965 and now Patent No. 3,331,748. The fuel element described in this copending application uses two layers of sheathing surrounding the nuclear fuel. This form of fuel element permits the choice of the material and thickness of each layer to be based on different considerations. The inner layer is chosen for its corrosion resistance and the outer layer for its strength and hence its resistance to swelling. The nuclear fuel is provided with a central void space to accommodate swelling caused by irradiation.

It has now been found that a nuclear fuel element of improved properties can be provided by the use of a sheathing assembly having three layers. The inner and outer layers are chosen to have structural strength and resistance to swelling. The interlayer is formed from ductile material and, although not bonded to either the inner or outer sheath, arranged to give good thermal conductance between the inner and outer sheaths and to transmit mechanical stress therebetween.

Figure 1:
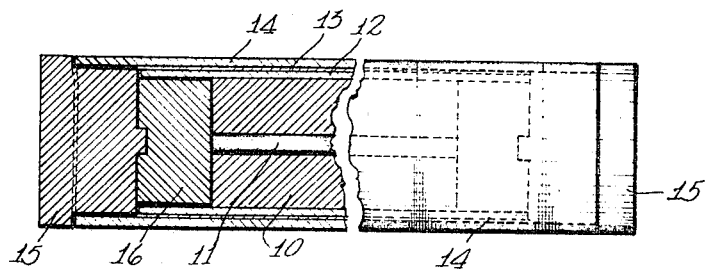
Figure 2:
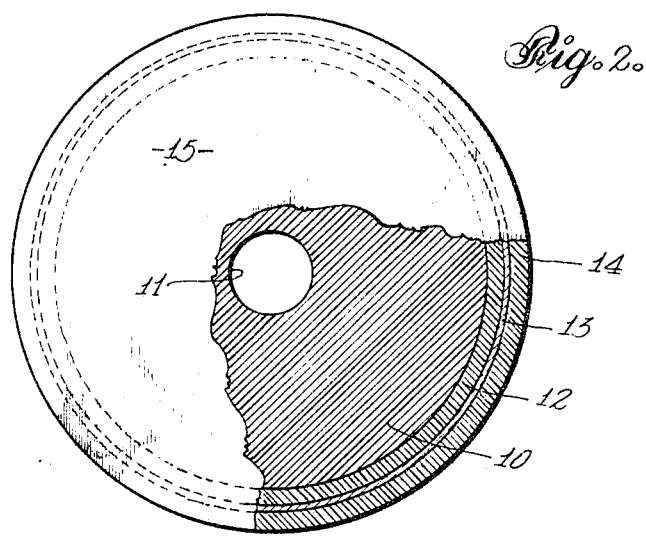

The invention will become apparent from the following description of a preferred embodiment taken in conjunction with the accompanying drawings, in which:

FIGURE 1 is a side view, partially in section, of a fuel element according to this invention, and FIGURE 2 is an end view, partially in section and on an enlarged scale, of the fuel element of FIGURE 1.

Referring now to FIGURES 1 and 2, there is shown a fuel element having a central core 10 of nuclear fuel. This central core is, preferably, formed from uranium metal which may, desirably, be stabilized, to reduce swelling caused by irradiation, by the addition of small amounts of selected elements. The central core 10 defines a void space 11 designed to accommodate any of the swelling which does take place upon irradiation of the fuel.

Central core 10 is surrounded by a sheath assembly consisting of an inner sheath 12 and an outer sheath 14 separated by an interlayer 13. End cap assembly 15 and 16 complete the fuel element at each end. According to this invention inner and outer sheaths 12 and 14 are formed from a structurally strong material and interlayer 13 from a ductile material. Interlayer 13 is in sufficiently intimate contact with the inner and outer sheaths to provide good thermal conductance and transmit mechanical stress therebetween. It is an important feature of the fuel element of this invention that the interlayer is not significantly bonded to the inner or outer sheaths. This provides a zone of isolation between the inner and outer sheaths so that any crack developing in one of these sheaths does not influence the formation of a crack in the other sheath. Accordingly, the failure rate of the outer sheath is statistically independent of the failure rate of the inner sheath leading to a fuel element of greater reliability than a conventional fuel element having a single sheath of thickness equal to the combined thickness of the inner and outer sheaths. In addition, the two separate sheaths have smaller internal stresses under the normal operating temperature gradient than the corresponding single sheath thus providing better sheath integrity.

Two further features of the fuel element of this invention may be provided by suitable choice of the material for the interlayer. If the material of the interlayer is such as to form a corrosion product with the coolant then any failure of the outer sheath permitting the coolant to react with the interlayer will be indicated by the presence of this corrosion product in the coolant. For ease of monitoring the corrosion product, it is desirable that the interlayer material be fissile; this is also desirable for reasons of neutron economy. The material of the interlayer may also be chosen to provide protection for a limited time in the event that a failure occurs of both the inner and outer sheaths. This limited time is sufficient for the signal given by corrosion of the intermediate sheath in the coolant to be noticed and appropriate action taken.

The central core 10 is, desirably, formed from uranium metal having minor alloying additions to reduce swelling upon irradiation. The uranium may contain up to 1.5 wt. percent of any of Al, Fe, C, Cr or Si either individually or in combination. This adjusted uranium metal core should be heat treated by being beta quenched from about 750° C. and annealed at about 550° C. for several hours to produce a fine grained randomly oriented structure containing a fine precipitate. Other uranium alloys which may be used may contain any of 0–10 wt. percent Zr or Al, or up to 1 wt. percent Mo or Nb. The volume of the central void 11 can vary from 2–15%, based on the uranium volume, depending on the operating conditions. Preferably, the void volume is about 5% of the uranium volume. The naturally occurring mixture of uranium isotopes is normally used, however, enriched uranium can be used if desired. Other fuel metals and their alloys such as Pu, Th, Pu-U, Th-U may be used.

The inner and outer sheaths 12 and 14 are formed from a corrosion-resistant zirconium alloy having a similar composition as that described for the fuel element outer sheath in the above-identified copending application. That is, preferably Zircaloy-2, with Zircaloy 4 and Zr containing about 2.5 wt. percent Nb also being suitable. Circumstances may occur in which stainless steel, Inconel, etc. would also be useful for the inner and outer sheaths.

The preferred material for the interlayer 13 is extremely ductile material formed by alloying aluminum with a small amount of uranium. The amount of uranium used may vary from 0–25 wt. percent, the preferred amount is around 10 wt. percent. The use of uranium in the alloy forming the interlayer serves to reduce the parasitic absorption of neutrons and increase the overall efficiency of the fuel element. The uranium alloy provides a desirable monitoring signal on fracture of the outer sheath, as described above. The uranium in the Al-U alloy may or may not be enriched in U235. A non-fissile material, such as lead or a ductile alloy may, however, also be used for the interlayer. Such alternative material may not necessarily give off a monitoring signal on failure of the outer sheath.

The end cap assembly consists of two portions 15 and 16. Portion 16 is welded to the inner sheath 12 and portion 15 is welded to the outer sheath 14. Typical dimensions of a fuel element according to this invention are as follows: length 50 cm.; outer diameter 1.52 cm.; outer sheath thickness 0.038 cm.; interlayer thickness of 0.018 cm.; inner sheath thickness 0.038 cm. These dimensions are not critical and may be varied to suit design requirements.

The fuel element of this invention may be fabricated by one of the following methods:

(1) Co-extrusion of the uranium central core and the inner Zircaloy sheath followed by slip fit assembly inside the interlayer and outer sheath. The outer Zircaloy sheath is then reduced in diameter by about 0.005 to 0.008 cm. by swaging or drawing through a die to provide intimate contact between the layers. The interlayer can be cut from shim stock of the appropriate material and assembled as a split cylinder.

(2) Individual fabrication of the elements and slip fit assembly followed by swaging or drawing as in (1). The uranium core can be made by casting or extrusion.

(3) Assembly of the uranium core and the inner Zircaloy sheath by co-extrusion or slip fit assembly, followed by extrusion cladding of this element by the interlayer material. The assembly so produced is then slip fitted into the outer sheath.

The following example illustrates the properties of the fuel element of this invention.

EXAMPLE

A specimen of Al-10 wt. percent U was sheathed in Zircaloy 2 and defects deliberately formed in the outer sheath. This specimen was corrosion tested in water at 300° C. for four hours. It was found that neither Zircaloy sheath was hydrided. The corrosion rate of Al-10 wt. percent U was found to be 50 mg./cm.$^2$/hr.

It is apparent that the corrosion products of the interlayer will not cause hydriding of the Zircaloy sheaths. This is important since if hydriding did occur due to a failure in the outer sheath it could cause rapid failure of the inner Zircaloy sheath of the complete fuel element. The corrosion rate of the Al-10 wt. percent U layer is sufficient to provide several hours protection in the event of failure of both Zircaloy sheaths in the complete fuel element while at the same time providing sufficient corrosion products to form a monitoring signal.

Thus there has been described a nuclear reactor fuel element of novel design having inner and outer sheaths separated by a ductile layer capable of transmitting pressure and conducting heat. The preferred material for the interlayer is such that it remains ductile under irradiation and the products of corrosion by the coolant do not react with a Zircaloy outer sheath but, instead, give a monitoring signal in the coolant. Uranium metal, itself, is not suitable for the interlayer since it becomes brittle under irradiation and its corrosion products seriously affect Zircaloy sheathing. By reason of the void in the central core of nuclear fuel and the stabilizing alloy additions to the nuclear fuel the fuel element of this invention is particularly useful for high burn-up applications, that is, the extraction of the maximum energy from the nuclear fuel. The fuel element of this invention is designed for a burn-up of the order of 10,000 mwd./te. U.

I claim:
1. A nuclear fuel element comprising,
   a central core of nuclear fuel having a void space therein, and
   a sheathing assembly surrounding said core consisting of inner and outer sheaths separated by and in contact with a continuous ductile interlayer,
   said inner and outer sheaths being constructed of zirconium metal or corrosion resistant zirconium alloy, said interlayer being constructed of aluminum metal or an aluminum alloy containing up to 25 wt. percent of uranium.
2. A nuclear fuel element comprising,
   a central core of uranium metal fuel having a void space therein, and
   a sheathing assembly surrounding said core consisting of inner and outer sheaths separated by and in contact with a continuous ductile interlayer,
   said inner and outer sheaths being constructed of corrosion resistant zirconium alloy, said interlayer being constructed of aluminum metal or an aluminum alloy containing up to 25 wt. percent of uranium.
3. A nuclear fuel element as defined in claim 2 wherein said central core consists of uranium metal alloyed with an element selected from the group of Al, Fe, C, Cr, Si, Zr, Mo and Nb, the Fe, C, Cr and Si being present up to 1.5 wt. percent total, the Al and Zr being present up to 10 wt. percent, the Mo and Nb being present in amounts up to 1.0 wt. percent, and the volume of the void space is in the range 2–15 percent of the volume of the alloyed uranium metal.
4. A nuclear fuel element as defined in claim 2 wherein said central core consists of uranium metal alloyed with up to 1.5 wt. percent of an element selected from the group of Al, Fe, C, Cr and Si and the volume of the void space is in the range 2–15 percent of the volume of the alloyed uranium metal.
5. A nuclear fuel element as defined in claim 4 wherein said alloyed uranium metal is beta quenched from about 750° C. and annealed at about 550° C.
6. A nuclear fuel element as defined in claim 3 wherein the volume of said void space is about 5 percent of the volume of the alloyed uranium metal.
7. A nuclear fuel element as defined in claim 2 wherein the interlayer is Al-10 wt. percent U.

References Cited

UNITED STATES PATENTS

| | | | |
|---|---|---|---|
| 2,756,489 | 7/1956 | Morris | 75—122.7 X |
| 2,789,072 | 4/1957 | White | 75—122.7 X |
| 2,830,896 | 4/1958 | Seybolt | 75—122.7 X |
| 2,863,816 | 12/1958 | Stacy | 176—70 |
| 3,098,024 | 7/1963 | Barney et al. | 176—82 |
| 3,136,051 | 6/1964 | Quinlan et al. | 176—82 X |
| 3,243,350 | 3/1966 | Lustman et al. | 75—122.7 X |
| 3,262,858 | 7/1966 | Gittus | 176—67 X |
| 3,325,375 | 6/1967 | Mogard | 176—67 |
| 3,331,748 | 7/1967 | Feraday | 176—70 |

FOREIGN PATENTS 853,302  11/1960  Great Britain.

BENJAMIN R. PADGETT, *Primary Examiner.*

MELVIN J. SCOLNICK, *Assistant Examiner.*

U.S. Cl. X.R.

29—400; 75—122.7; 176—89, 91